(12) United States Patent
Kalkbrenner et al.

(10) Patent No.: US 9,507,137 B2
(45) Date of Patent: Nov. 29, 2016

(54) MICROSCOPE WITH STRUCTURED ILLUMINATION USING DISPLACEABLE GRID STRUCTURES

(71) Applicant: Carl Zeiss Microscopy GmbH, Jena (DE)

(72) Inventors: Thomas Kalkbrenner, Jena (DE); Ingo Kleppe, Jena (DE); Ralf Netz, Jena (DE)

(73) Assignee: Carl Zeiss Microscopy GmbH, Jena (DE)

(*) Notice: Subject to any disclaimer, the term of this patent is extended or adjusted under 35 U.S.C. 154(b) by 87 days.

(21) Appl. No.: 14/222,142

(22) Filed: Mar. 21, 2014

(65) Prior Publication Data
US 2014/0291484 A1 Oct. 2, 2014

(30) Foreign Application Priority Data
Mar. 22, 2013 (DE) .................. 10 2013 004 963

(51) Int. Cl.
G02B 21/08 (2006.01)
G02B 21/16 (2006.01)
G02B 27/09 (2006.01)

(52) U.S. Cl.
CPC ............. *G02B 21/082* (2013.01); *G02B 21/16* (2013.01); *G02B 27/0988* (2013.01)

(58) Field of Classification Search
CPC . G02B 21/082; G02B 21/16; G02B 27/0988
See application file for complete search history.

(56) References Cited

U.S. PATENT DOCUMENTS

| RE38,307 E | 11/2003 | Gustafsson et al. |
| 2007/0242336 A1* | 10/2007 | Vodyanoy .......... G01N 21/6458 359/234 |
| 2012/0206576 A1* | 8/2012 | Sato .................... G02B 5/3058 348/46 |

OTHER PUBLICATIONS

Bertero M. et al., "Super-Resolution in Confocal Scanning Microscopy", Inverse Problems 3, 1988, pp. 195-212.
Dertinger T. et al., "Fast, Background-Free, 3D Super-Resolution Optical Fluctuation Imaging (SOFI)", PNAS, Dec. 29, 2009, vol. 106, No. 52, pp. 22287-22292.
Grochmalicki J. et al., "Superresolving Masks for Incoherent Scanning Microscopy", J. Optical Society of America A, May 1993, vol. 10, No. 5, pp. 1073-1077.
Heintzmann R. et al., "Laterally Modulated Excitation Microscopy: Improvement of Resolution by Using a Diffraction Grating", Proceedings of SPIE, 1998, vol. 3568, pp. 185-196.
Lukosz W. et al., "Optischen Abbildung Unter Überschreitung Der Beugungsbedingten Auflösungsgrenze", Optical Imaging Exceeding the Diffraction-Based Resolution Limit; Optica Acta, 1963, vol. 10, pp. 241-255.

(Continued)

*Primary Examiner* — Francis M Legasse, Jr.
(74) *Attorney, Agent, or Firm* — Nixon Peabody LLP; Jeffrey L. Costellia

(57) ABSTRACT

A microscope and a method of microscopy use structured illumination, involving imaging a grid structure or periodic light distribution on a sample. By displacing the image of the grid structure, imaging is carried out under different phase positions, and a high-resolution sample image is calculated from the recorded images. The grid structure or light distribution is generated by using at least two phase grids arranged one in front of the other, and different orientations of the light distribution perpendicular to the illumination direction are generated by displacing the phase grids relative to one another, with displacement, imaging and calculation being carried out for different orientations.

12 Claims, 5 Drawing Sheets

(56) References Cited

OTHER PUBLICATIONS

Figure 1:
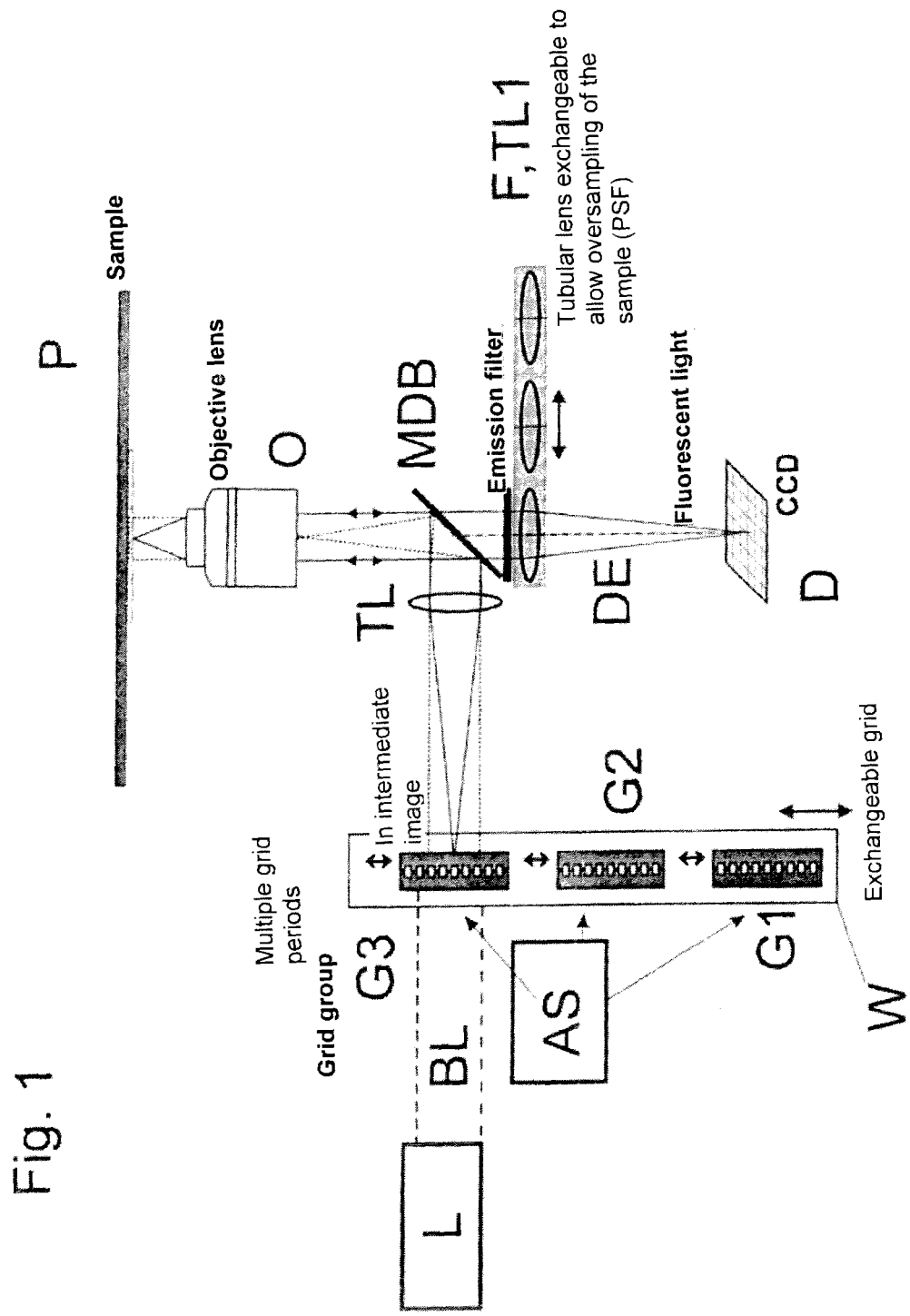
Figure 2:
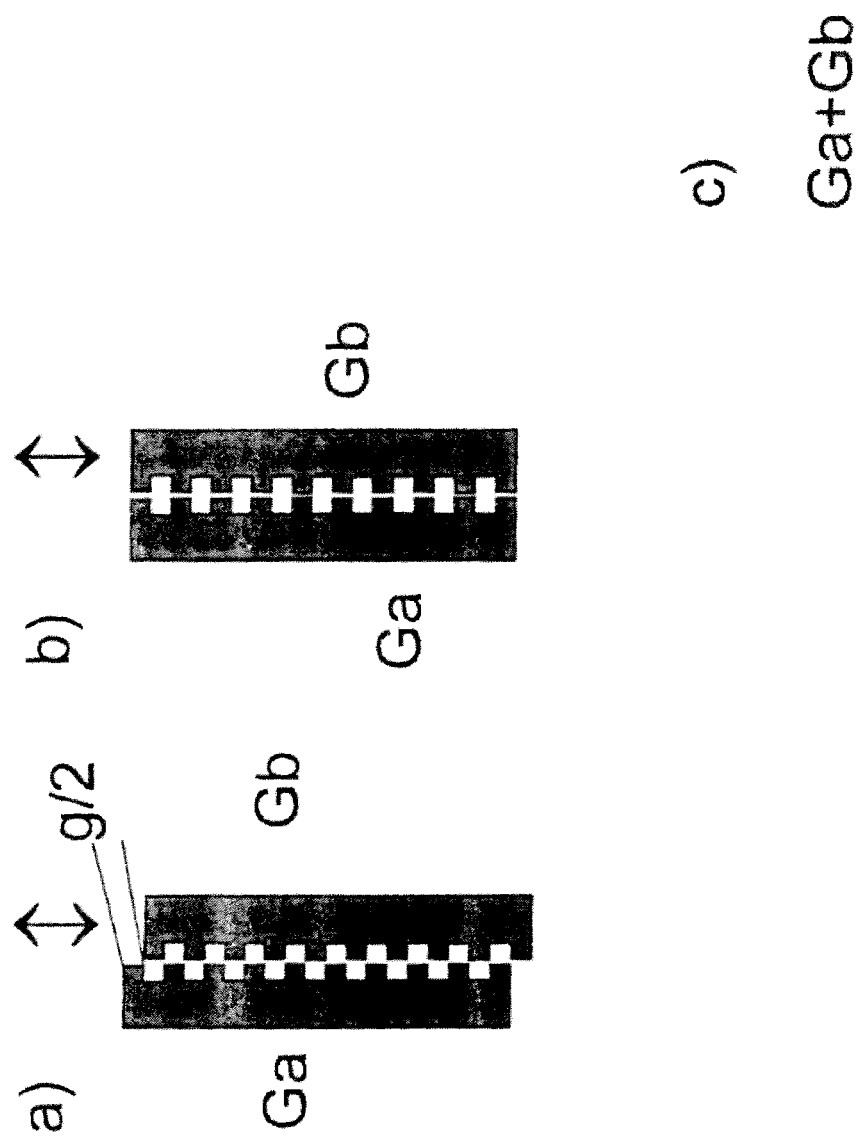

Sheppard R. et al., "Super-Resolution in Confocal Imaging", Optik 80, 1982, No. 2, pp. 53-54.
Schwartz O. et al., "Quantum Superresolution in Fluorescence Microscopy", Fluor Escence Antibunching Microscopy, 2011, pp. 1-4.
Mueller C , "Image Scanning Microscopy", Physical Review Letters, 104, 2010, pp. 198101-198101-4.
Shao L. et al., "Super-Resolution 3D Microscopy of Live Whole Cells Using Structured Illumination", Nature Methods, Dec. 2011, vol. 8, No. 12, pp. 1044-1048.
Gustafsson M. et al., "Doubling the Lateral Resolution of Wide-Field Fluorescence Microscopy Using Structured Illumination", Proceedings of SPIE, 2000, vol. 3919, pp. 141-150.

* cited by examiner

MICROSCOPE WITH STRUCTURED ILLUMINATION USING DISPLACEABLE GRID STRUCTURES

LITERATURE AND RELEVANT PATENTS

[1] Bertero et al., in Inverse Problems 3, 195 (1988)
[2] Sheppard et al., in Optik 80, No. 2, 53 (1982)
[3] Grochmalicki et al., in J. Opt. Soc. Am. A 10, 1074 (1993) rde
[4] C. B. Mueller et al., in Phys. Rev. Lett. 104, 198101 (2010)
[5] Schwartz O.; Oron D.: "Fluorescence antibunching microscopy", (2011)
[6] Dertinger T.; Colyer R.; Iyer G.; Weiss S.; Enderlein J.: In PNAS 106, 22287 (2009)
[7] Lukosz W. and Marchand M.: Optischen Abbildung unter Überschreitung der beugungsbedingten Auflösungsgrenze [Optical imaging exceeding the diffraction-based resolution limit]; in Optica Acta, Vol. 10, 241-255 (1963)
[8] Heintzmann R.; Cremer C.: Laterally Modulated Excitation Microscopy: Improvement of resolution by using a diffraction grating; In Proceedings of SPIE, Vol. 3568 (1998)
[9] Gustafsson Mats G. L.; Agard David A. and Sedat W.: Doubling the lateral resolution of widefield fluorescence microscopy using structured illumination; in Proceedings of SPIE, Vol. 3919 (2000)
[10] Shao L.; Kner P.; Hesper E.; Gustafsson Mats G. L.: Super-resolution 3D microscopy of live whole cells using structured illumination; in Nature Methods, Vol. 8 (2011)
[11] Heintzmann R.; Jovin T.; Cremer C.: Saturated patterned excitation microscopy—a concept for optical resolution improvement, in JOSA A, Vol. 19, 1599-1609 (2002)
[12] Gustafsson Mats G. L.; Agard David A. and Sedat W.: METHOD AND APPARATUS FOR THREE-DIMENSIONAL MICROSCOPY WITH ENHANCED DEPTH RESOLUTION; in PCT WO 96124082, US96101324.

In microscopes having so-called structured illumination (SIM), the modulation depth of the optical imaging of a periodic structure (e.g., grid) is used as a criterion for depth of focus. The image of the periodic structure is characterized by the frequency of modulation and the phase position (image phase) of modulation.

By shifting the phase of the structure perpendicular to the optical axis, different projection scenarios can be obtained.

In general, at least 3 phase images PB at 0°, 120° and 240° are required for calculating strip-free, depth-discriminated optical sections. These phase images (PB) are then processed to obtain a (confocal) optical sectional image in an image processor using the following formula:

$$I_{Section}(x) = Const \cdot \sqrt{\begin{array}{l}(I(x, 0°) - I(x, 120°))^2 + \\ (I(x, 120°) - I(x, 240°))^2 + \\ (I(x, 0°) - I(x, 240°))^2\end{array}}$$

in which I(x, angle) describes the intensity at the respective pixel in the corresponding phase image.

In the simplest case, the 3 or more phase images are recorded sequentially. In this case, it is assumed that the sample is not moved during measurement of the images.

The sectional images and/or sectional stacks thus calculated from the phase images can then be displayed on a standard PC and monitor using 3-D processing software.

Spatial resolution along the optical axis is determined by the wavelength of the light, the numerical aperture of the objective lens and the modulation frequency.

For a detailed description of the processing algorithm, reference is made to T. Wilson et al.: "Method of obtaining optical sectioning by using structured light in a conventional microscope"; Optics Letters 22 (24) 1997.

To achieve this heightened resolution in all two-dimensional directions with a maximum signal-to-noise ratio, the orientation of the grid in the intermediate image plane of the microscope must be adjusted.

Three directions (i.e., three grids having differently oriented grid vectors) is the minimum number of directions that are required for this heightened resolution.

Several technical solutions are available for changing the grid direction in the sample area, such as optical image field rotators (e.g., Abbe-King prism) EP1617259 A1 or "spatial light modulators" (SLM) [10], for example.

These are generally very costly, and most are too slow or even unstable.

This is where the present invention can offer an advantageous alternative.

The invention is characterized by the independent patent claims.

Preferred further developments are the subject matter of the dependent claims.

A principal advantage of the paired or grouped grid arrangement according to the invention is the possibility of faster, for example, piezoelectric switching of the grid direction in the sample area (orders of diffraction in the pupil).

FIG. 1 schematically illustrates the beam path of a microscope for SIM microscopy.

The illumination light L travels along an illumination beam path BL and through a grid pair G3 arranged in an intermediate image of objective lens O and tubular lens TL to a main color splitter MDB.

From there, it is reflected in the direction of a sample P and travels through the objective lens to the sample. The fluorescent light from the sample P travels in the reverse direction through the objective lens 0 and the MDB in transmission via optional emission filters F and an exchangeable tubular lens assembly TL1 to a detector DE, preferably a CCD camera.

The grid groups G1, G2 and G3 configured according to the invention and arranged in an exchangeable device W have different grid periods g, for example, and are each embodied as displaceable perpendicular to the optical axis by means of a control unit AS for the purpose of generating different phase positions in the SIM process.

In the following, the configuration of grid groups G1-G3 according to the invention, consisting, for example, and without restriction, of two phase grids arranged one above the other, will be specified in greater detail in reference to FIG. 2-5.

FIG. 2a) and b) show two strip-shaped phase grids Ga and Gb with parallel strip orientation, said strips being displaceable relative to one another, perpendicular to the path of the grid lines thereof.

In position a), the grid lines are displaced relative to one another by g/2. "g" is the grid constant and corresponds to the distance between two (bright or dark) strips.

In this case, there is no grid effect because the bright and dark strips cancel each other out, i.e., the laser light is not diffracted.

In position 2b), Ga and Gb are precisely superimposed over one another, resulting in grid strips with dual phase effect.

FIG. 2c) shows the grid activated in this manner, wherein the phase deviation is adapted to the desired energy distribution to the orders of diffraction.

The energy distribution to the 1st, $0^{th}$ and $-1^{st}$ orders of diffraction is to be adjusted by means of a suitable phase deviation such that approximately 5 . . . 10% of the total energy is conducted to the $0^{th}$ order of diffraction. This also enables heightened resolution in the axial direction.

The two grids must advantageously be close to one another in the axial direction (illumination direction) in order for them both to be in the focal point of the tubular lens, i.e., in an intermediate image plane, and to act as a common grid.

For this purpose, the focal length should accordingly be greater than the axial extension of the grid structure of the two grids together.

Figure 3:
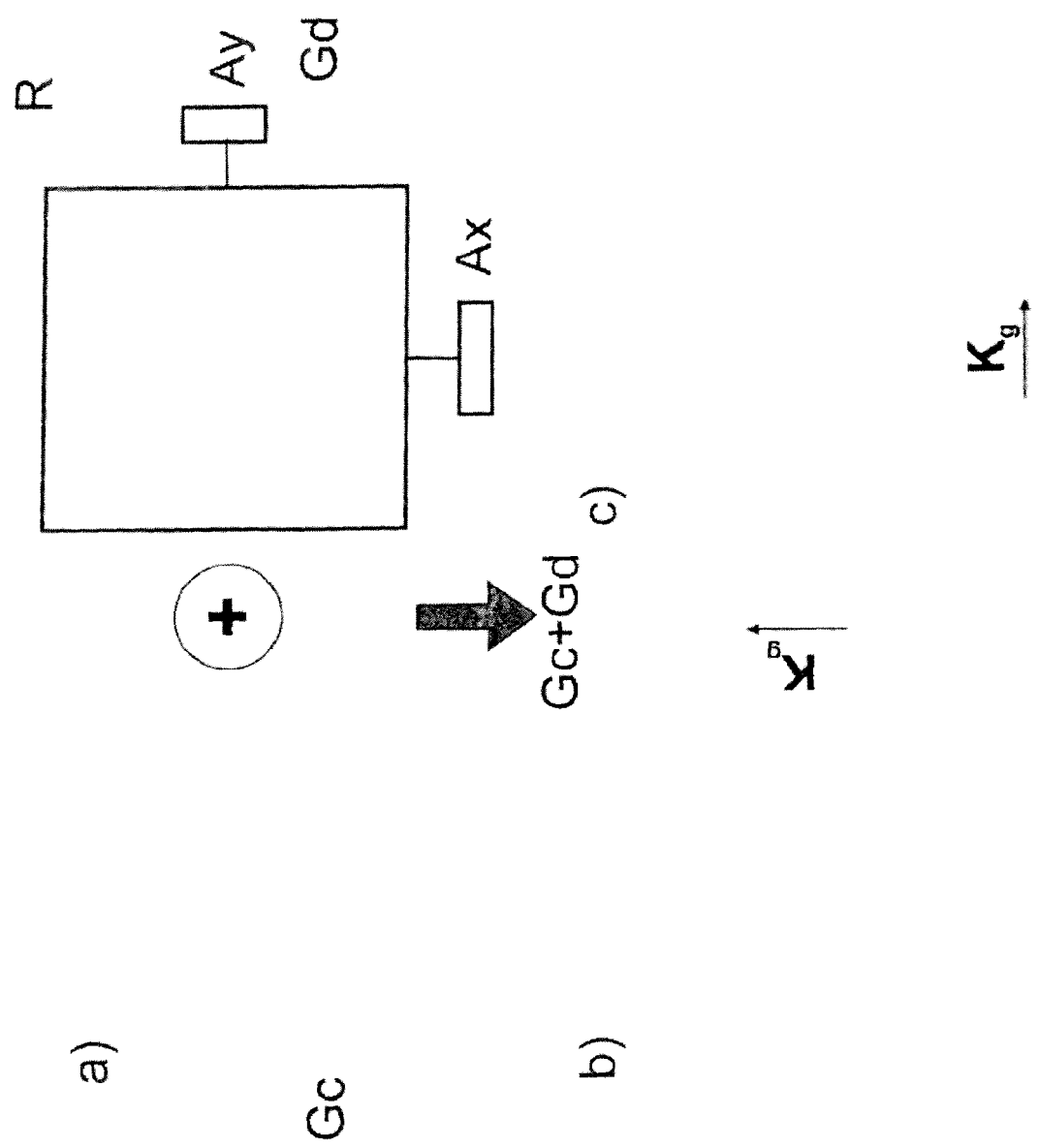

FIG. 3 shows, in a) switchably paired grids Gc, Gd having two grid vectors on the two grids in a design as crossed strip grids, an embodiment for generating only one grid vector, optionally with two directions (vertical and horizontal), each using two grid vectors in one plane.

By shifting the grid Gd, one of the grid vectors can be switched off.

Two cross grids Gc and Gd are shown by way of example, which are superimposed and are displaceable relative to one another.

For this purpose, at Gd for example, a displacement in the x- and y directions is implemented by means of displacement means Ax, Ay, which can be connected to a central control unit.

Various superimpositions of the two grids are shown in 3b and 3c.

In 3b, Gc is displaced relative to Gd in the x-direction by g/2, and therefore, the effect of the horizontal grid lines is canceled out and only an effect in the direction of the vertical grid vector Kg results.

In 3c, the grids are displaced relative to one another in the vertical y-direction by g/2, and therefore, only a grid effect in the direction of the horizontal grid vector Kg results.

Figure 4:
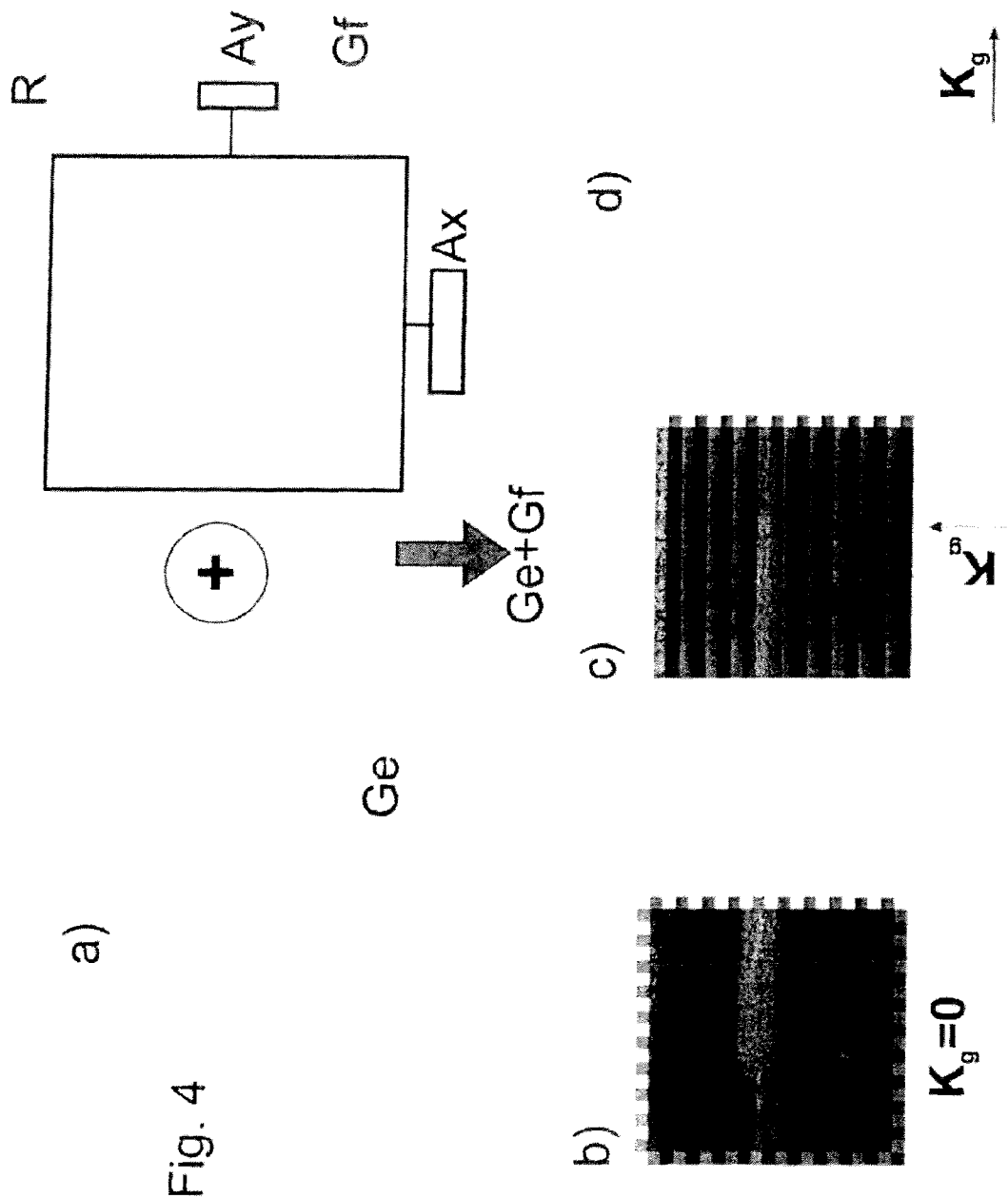

In contrast to FIG. 3, FIG. 4 shows two cross grids Ge and Gf, wherein the phase deviations are added together at each of the points of intersection.

4b shows how the grid effect is canceled out (bright field illumination), in that the grids are superimposed such that the bright and dark points cancel each other out.

This is accomplished, for example, by mutual displacement in the x- and y-directions, resulting in a 45-degree displacement of Ge and Gf relative to one another.

4c) and 4d) show the adjustments as illustrated in 3b and 3c.

Figure 5:
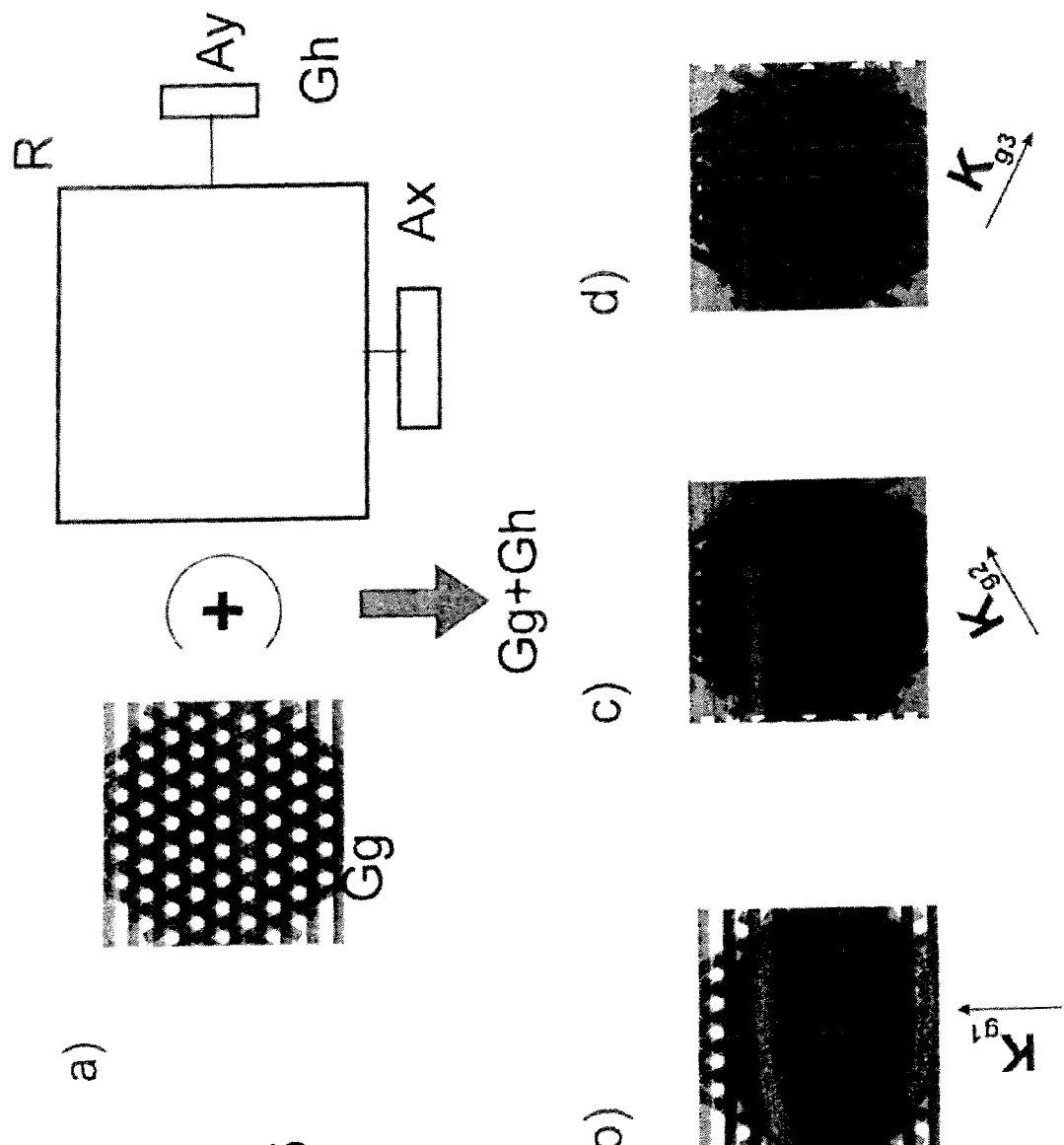

FIG. 5 shows grids Gg and Gh, each of which consists of three strip arrangements that are offset approximately 60 degrees relative to one another, in other words, having three grid vectors Kg1, Kg2, Kg3, wherein once again, the phase deviations are added together at the points of intersection.

By superimposing two grids and displacing one of the two grids, two grid vectors can be deactivated, leaving only one grid vector active (b, c and d).

In this case, the mutual phase displacement is carried out in the direction of the grid vector Kg shown.

It is assumed in principle that the method can be theoretically expanded to include any number of grid vector directions (modulation directions within the sample area).

Moreover, the invention is not limited to the embodiments described. In particular, the grids may be located in supports having geometries other than a rectangular shape.

In structured illumination microscopy, at least three phase-displaced but otherwise identical sinusoidal illumination patterns and sample images associated therewith are generated and then processed for each direction of the phase diffraction grid and/or the sinusoidal illumination within the sample plane that is associated therewith. This means that once a grid vector or the diffraction grid has been activated by a relative displacement between the two grids, the two grids must be displaced together in the same manner in order to generate the phase displacement of the illumination pattern in the sample.

The invention claimed is:

1. A method for structured illumination microscopy comprising:
   imaging a grid structure or periodic light distribution onto a sample, wherein by displacing the image of the grid structure, imaging is carried out under different phase positions, and a high-resolution sample image is calculated from the recorded images,
   wherein the grid structure or light distribution is generated by using at least two phase grids arranged one in front of the other in the direction of the optical axis, and different orientations of the light distribution perpendicular to the illumination direction are generated by displacing the phase grids relative to one another transversely to the optical axis, with displacement, imaging and calculation being carried out for different orientations.

2. The method according to claim 1, wherein at least two strip grids having strip orientations that are parallel to one another are used.

3. The method according to claim 1, wherein cross-grids having grid vectors that are perpendicular to one another are used.

4. The method according to claim 1, wherein phase grids having grid strips that generate three grid vectors at an angle to one another—preferably 60°—are used.

5. The method according to claim 1, wherein the grids that are used are arranged one in front of the, other, spaced from one another in the direction of the optical axis below the focal length of a tubular lens that is used.

6. A microscope for structured illumination having an illumination beam path and a detection beam path for implementing the method according to claim 1,
   wherein a grid arrangement for generating a periodic light distribution on a sample is arranged in the illumination beam path,
   wherein the grid arrangement consists of at least two phase grids arranged one in front of the other in the illumination beam path, and displaceable relative to one another, perpendicular to the illumination direction.

7. The microscope according to claim 6, wherein at least two strip grids having a parallel strip orientation are used in the illumination beam path.

8. The microscope according to claim 6, wherein cross grids having grid vectors that are perpendicular to one another are used.

9. The microscope according to claim 6, wherein phase grids having grid strips that generate three grid vectors at an angle to one another are used.

10. The microscope according to claim 6, wherein grids that are arranged one in front of the other are used, spaced from one another in the direction of the optical axis below the focal length of a tubular lens that is used.

11. The method according to claim 4, wherein the angle is 60°.

12. The microscope according to claim 9, wherein the angle is 60°.

\* \* \* \* \*